United States Patent [19]

Schwarz

[11] 4,091,164

[45] May 23, 1978

[54] POLYMER MODIFIED HYDROPHILIC INORGANIC FILLERS FOR THERMOPLASTIC POLYMERIC MATERIALS

[76] Inventor: Eckhard C. A. Schwarz, 115 N. Park Ave., Neenah, Wis. 54956

[21] Appl. No.: 739,226

[22] Filed: Nov. 5, 1976

Related U.S. Application Data

[62] Division of Ser. No. 573,217, Apr. 30, 1975, Pat. No. 4,017,452.

[51] Int. Cl.$^2$ .................... B32B 5/16; B32B 9/04; B32B 19/02
[52] U.S. Cl. .................... 428/404; 106/308 M; 260/37 AL; 260/42.14; 260/42.56; 427/221; 428/408; 428/403
[58] Field of Search ........... 427/221, 212, 289, 374 R, 427/374 C; 428/15, 144, 147, 403, 407, 404; 106/308 M; 260/42.14, 37 AL, 42.56, 823; 252/363.5

[56] References Cited

U.S. PATENT DOCUMENTS

| | | | |
|---|---|---|---|
| 3,004,858 | 10/1961 | Sheehan et al. | 260/37 R X |
| 3,443,492 | 5/1969 | Pleass | 428/221 X |
| 3,451,835 | 6/1969 | Ganter et al. | 106/308 M X |
| 3,458,804 | 7/1969 | Wolf et al. | 106/309 X |
| 3,483,156 | 12/1969 | Mills et al. | 106/308 M X |
| 3,834,924 | 9/1974 | Grillo | 106/308 M |

OTHER PUBLICATIONS

Schonfeldt, Surface Active Ethylene Oxide Aducts, Pergamon Press, (1969), p. 451.

*Primary Examiner*—George F. Lesmes
*Assistant Examiner*—R. Eugene Varndell, Jr.
*Attorney, Agent, or Firm*—Joseph P. House, Jr.

[57] ABSTRACT

Normally hydrophilic inorganic fillers for polymeric resins are modified to enhance their dispersibility in such resins by admixing filler particles with a block copolymer of ethylene oxide and propylene oxide under shear and at an elevated temperature so as to coat the filler particles with a portion of the block copolymer. Thermoplastic polymeric resins, such as polyethylene and polypropylene, containing thus-modified fillers can be conventionally formed into products, such as thin film bags, having improved strength properties.

3 Claims, No Drawings

4,091,164

POLYMER MODIFIED HYDROPHILIC INORGANIC FILLERS FOR THERMOPLASTIC POLYMERIC MATERIALS

This application is a division of copending application Ser. No. 573,217 filed Apr. 30, 1975, now U.S. Pat. No. 4,017,452.

BACKGROUND OF THE INVENTION

This invention relates to filled thermoplastic polymeric resinous compositions in which the fillers have been modified to enhance their compatibility with polymeric resins and to improve the physical properties of products formed from the filled resin compositions.

Inorganic fillers or pigments, such as clays, titanium dioxide, barium sulfate, calcium sulfate, talc and the like are commonly blended with synthetic polymeric resins as extenders, and to provide opacity of color and/or to act as delustrants for articles formed from the resins. The quantity of such fillers used is usually very limited because larger amounts tend to reduce the strength of the article formed from the filled resinous composition to the point where they are unacceptable for their intended use.

Apparently, the decrease in physical integrity attendant with larger amounts of these inorganic fillers is related to the surface energy of both the filler and the polymeric resin. The surface of these inorganic fillers tend to be hydrophilic and organophobic. On the other hand, polymeric resins, particularly thermoplastic polyolefinic resins, tend to be hydrophobic. In other words, the resultant physical integrity is related to the adhesion of the polymeric resin to the inorganic filler. When there is good adhesion of the polymeric resin to the surface of the inorganic filler, i.e., the polymeric resin wets the surface of the inorganic filler, products formed from the filler resinous composition usually have increased physical strength. On the other hand, poor adhesion or wetting of the inorganic filler by the polymeric resin results in decreased physical strength, particularly the tear strength of thin films formed from filled thermoplastic polymeric resin compositions.

Various methods have been proposed to modify the surface energy of various inorganic fillers so as to make them readily dispersible or miscible in polymeric resins. An example of such a method is described in U.S. Pat. No. 3,697,474. In the method disclosed by this patent, reactive titanium esters of long chain olefinic acids are dissolved in an inert organic solvent, the surface of the inorganic filler particles, such as clay, is wetted with this solution and the titanium compound reacts with the inorganic filler to provide it with a hydrophobic, organophilic film. This grafting method provides good adhesion of the reactive portion of the ester molecule to the filler surface and produces a modified filler having a surface energy substantially matching that of various polymeric resin so that the modified filler is readily dispersible therein. This method has several practical disadvantages. For instance, expensive reagents and relatively large quantities of solvent are required. Also, the solvent and hydrolysis products must be removed from the modified filler by distillation or filtering. Furthermore, during extrusion of polymeric resins filled with such modified fillers, free acids contained in the filler tend to evaporate, causing an unpleasant oder in the surrounding area and in the product itself. This odor often remains with the product for several weeks, thereby limiting the commercial applications thereof.

Examples of other prior art methods for modifying inorganic fillers are disclosed in U.S. Pat. No. 3,004,858 wherein an alkylene oxide polymer is dissolved in a solvent and this solution is added to and stirred with a slurry of titanium dioxide pigment and U.S. Pat. No. 3,573,944 wherein a clay is first activated by heating to an elevated temperature of 300°–700° C and then polymerized with a divinyl ether monomer dissolved in a solvent. Both of these processes require the relatively expensive steps of removing the modified filler from the solvent media and drying to remove residual solvent.

Examples of still other prior art methods for modifying inorganic fillers are disclosed in U.S. Pat. Nos. 3,767,444, 3,642,510, 3,458,804 and 3,451,835.

SUMMARY OF THE INVENTION

An object of the invention is to provide inorganic fillers which are modified so as to be readily dispersible in thermoplastic polymeric resins, such as polyethylene and polypropylene.

Another object of the invention is to provide a simplified method for modifying inorganic fillers to make them readily dispersible in thermoplastic polymeric resins.

A further object of the invention is to provide thermoplastic polymeric resins containing inorganic fillers and having improved impact strengths.

A still further object of the invention is to provide an inorganic filled film which is formed from a thermoplastic polyolefinic resin and has improved impact strength characteristics, particularly, improved tear strength.

Other objects, aspects and advantages of the invention will become apparent upon reviewing the following detailed description and the appended claims.

According to the invention, particles of an inorganic filler are admixed with a block copolymer which has an A-B-A structure with the A units being a homopolymer of ethylene oxide, the B unit being a homopolymer of propylene oxide, and the mole ratio of ethylene oxide to propylene oxide being within the range of about 40:60 to about 90:10 and has an average molecular weight of at least 3,000. This admixture is compounded at an elevated temperature for sufficient time for the block copolymer to coat the filler particles and produce a modified filler which is readily dispersible in various thermoplastic polymeric resins and is capable of imparting improved impact strength to products formed from the filled resin compositions. By using such a block copolymer, it has been found that modified inorganic fillers having these desirable properties can be produced by only the mixing and fusing of two materials together without the need for using expensive reagents or a solvent media and the expensive processing steps associated therewith. Furthermore, it has been found that films having increased impact strengths can be produced from thermoplastic polymeric resins, particularly polyolefinic resins such as polyethylene and polypropylene, containing modified inorganic fillers provided by the invention.

DESCRIPTION OF THE PREFERRED EMBODIMENTS

Inorganic fillers suitable for use in the invention include inorganic fillers or pigments commonly added to thermoplastic polymeric resins as extenders, coloring additives, and/or delustrants. As long as the inorganic filler originally has a hydrophilic surface with an aqueous wetting angle of less than 50°, the specific chemical nature of the filler is not important. Representative examples of suitable fillers include siliceous clays, such as kaolin clay (including the several species of hydrated aluminosilicate minerals falling within the generic class), titanium dioxide, barium sulfate, calcium sulfate calcium carbonate, magnesium silicate (talc), zinc oxide, diatomaceous earth and mixtures thereof. Generally, the inorganic filler should be chemically inert with respect to the thermoplastic polymeric resin with which it is to be blended and also be relatively heat resistant as compared to the resin so as not to be degraded upon melting the resin during processing to form the desired end product. Presently, clays are the preferred inorganic filler, with kaolin clay being the most preferred because of its availability, low cost and generally optimum particle size.

To facilitate a homogeneous admixture and wetting by the black copolymer during compounding, the inorganic filler should be in a relatively fine, subdivided state. The inorganic filler preferably is in particulate form of various particle size distribution and particle shape, but also can be in fibrous form. Generally, the overall range of the particle size for the organic filler may be from submicron to 100 microns. Inorganic fillers having a median particle size of less than about 5 microns are preferred.

The block copolymer used for modifying the inorganic filler in accordance with the invention has an A-B-A structure with the A units being a homopolymer of ethylene oxide, the B unit being a homopolymer of propylene oxide and the mole ratio ethylene oxide to propylene oxide being within the range of about 40:60 to about 90:10 and has an average molecular weight of at least 3,000. Block copolymers suitable for use in modifying inorganic fillers in accordance with the invention can be represented by the general formula:

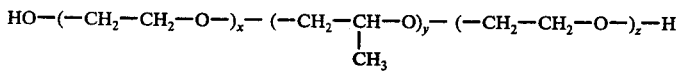

$$HO-(-CH_2-CH_2-O-)_x-(-CH_2-CH-O)_y-(-CH_2-CH_2-O-)_z-H$$
$$|$$
$$CH_3$$

where $x$ and $z$ are integers of at least 10 and $y$ is an integer of at least 20. Acceptable commercially available block copolymers are marketed under the trademark Pluronics by BASF-Wyandotte.

Inorganic fillers modified by such block copolymers having a molecular weight less than about 3,000 and a mole ratio of ethylene oxide to propylene oxide to less than about 40:60 do not substantially improve the impact strength of products formed from thermoplastic polymeric resins filled therewith. Preferably, the mole ratio of ethylene oxide to propylene oxide in the block copolymer is at least 50:50, with the most preferred range being about 60:40 to about 80:20.

The block copolymers can be prepared in any conventional manner and are commercially available as mentioned above. In one conventional manner, the block copolymers are prepared by condensing ethylene oxide with a hydrophobic base formed by the condensation of propylene oxide with propylene glycol. The block copolymer can be in any relatively small particulate form, such as flakes, which will afford homogeneous mixing thereof with the inorganic filler.

The admixture of inorganic filler and block copolymer is intimately compounded together at an elevated temperature where the block copolymer is in a molten state and has a viscosity low enough to wet the surfaces of the inorganic filler particles. In this manner, the surface energy of the filler particles is modified and becomes hydrophobic so that the resultant modified filler particles have a surface polarity similar to that of various thermoplastic polymeric resins. That is, the modified inorganic particles and the resin have generally matching cohesive energy densities and are thermodynamically compatible, permitting them to be homogeneously mixed together during processing of the filled resin to form various end products. Although the mechanism involved is not fully understood at this time, it is believed that the hydrophilic or polar portion of the block copolymer molecule, i.e., the ethylene oxide block, attach or bond to the hydrophilic or polar surface of the inorganic filler particles and the non-polar or hydrophobic portion of the block copolymer molecule, i.e., the propylene oxide blocks, is repelled from the surface of the inorganic particles and forms a thin coating thereover. It has been found that homopolymers of ethylene oxide or propylene oxide and random copolymers of ethylene oxide and propylene oxide do not provide the same degree of modification to inorganic fillers.

The amount of inorganic fillers used in the starting admixture can be within the range of about 5 to about 95 wt. %, preferably within the range of about 10 to about 50 wt. % and most preferably within the range of about 20 to about 30 wt. % based on the total weight of the admixture.

In order to obtain the desired homogeneous dispersion of the filler and the block copolymer so that the filler particles are appropriately coated with the block copolymer, the starting admixture preferably is compounded under shear, such as in a Banbury mixer or auger type extruder, at a temperature of at least about 80° C. At temperatures below about 80° C. the inorganic filler particles are not adequately modified to impart the desired improvement in impact strength to products formed from thermoplastic polymeric compositions filled therewith. Compounding temperatures above the level where the inorganic filler is degraded or decomposed should be avoided. For best results, the compounding temperature generally should be within the range of about 100° to about 250° C, preferably within the range of about 150° to about 200° C.

The time period of the compounding step will vary depending upon the particular type of inorganic filler being used, the particle size of the filler and the block copolymer and the molecular weight of the block copolymer. As a guide, a time period of about 5 to about 10 minutes is adequate when a temperature of about 150° to about 200° C is used.

When the concentration of the inorganic filler is above about 70 wt. %, it is often difficult to obtain the desired homogeneous dispersion of the filler and the block copolymer by dry mixing because of the poor flow characteristics. In this case, the block copolymer can be dissolved in an organic solvent, such as methanol, acetone, methyl, ethyl ketone and dioxane, the inorganic filler is added to this solution and the resultant slurry is stirred for about 1 to about 5 minutes. Following removal of the solvent and drying, the resulting compound can be heated, such as in an oven, at the same temperatures and for the same periods mentioned above.

Following the compounding step, the resulting compound is cooled to solidification and then comminuted, such as by grinding, into the particle size and shape desired for use as a filler for thermoplastic polymeric resins. Generally, a particle size distribution within the range of about 1 to about 20 microns is suitable for this purpose. The modified filler is ready for use without any further treatment.

Used herein, the term "thermoplastic polyolefinic resin" means polyolefinic resins which are thermoplastic in nature, i.e., become softened and flowable upon heating above their thermal softening point without decomposition. Such thermoplastic materials are a well known class of materials and include polymerized olefins, such as polyethylene, polypropylene, polybutylene and various copolymers thereof. Polyethylene, polypropylene and copolymers thereof are preferred. Modified fillers provided by the invention are particularly adaptable for use in polyethylene and polypropylene compositions employed for making thin films which are formed into bags and the like.

Modified fillers provided by the invention can be blended and uniformly dispersed with a thermoplastic polymeric resin at a concentration of about 1 to about 30 wt. %, preferably about 5 to about 20 wt. % using any of the conventional means commonly used in the plastic industry. For instance, the filler and thermoplastic polymeric resin can be mixed together in a ball mill, Banbury mixer or the like or without other conventional additives, such as plasticizers, anti-oxidants, UV absorbers, lubricants, dyes and the like. The filled resin composition can then be molded, cast or extruded in a conventional manner into articles of various sizes, shapes and thickness as desired.

As mentioned above, one particularly advantageous feature of the invention is that thin film products formed from thermoplastic polyolefinic resins filled with the modified fillers exhibit significantly improved dynamic breaking strength, e.g., in some cases the tensile strength of filled films is increased 25% or more over unfilled film. Also, the heat seals formed in such filled film products have substantially improved impact strengths.

Without further elaboration, it is believed that one skilled in the art can, using the preceding description, utilize the present invention to its fullest extent. The following examples are presented to illustrate preferred embodiments of the invention and are not to be construed as undue limitations thereof.

EXAMPLE I 50 lb. of a block copolymer of ethylene oxide and propylene oxide in pellet form were admixed in a tumbler with 50 lb. of powdered kaolin clay. The block copolymer marketed under the trademark Pluronics by BASF-Wyandotte, had an A-B-A structure with the A units being a homopolymer of ethylene oxide and the B unit being a homopolymer of propylene oxide, a mole ratio of ethylene oxide to propylene oxide of 80:20, an average molecular weight of 14,000 and a melting point of 56° C.

The admixture was charged to a Banbury mixer and compounded for 5 minutes at 200° C, discharged from the mixer and allowed to cool to solidification. The resulting hard, brittle substance was ground into chips having an average particle size of about ¼ inch. Separate samples of these chips were blended with chips of a low density polyethylene having a melt index of 4 (ASTM 1238) in a rotating drum at respective concentrations of 5 and 10 wt. %, based on the total weight of the blend. Each of the resulting blends were introduced into a conventional extruder for produced a blown film, having a 3½ inch extruder and a 12 inch circular die, to produce a tubular extrudate having a 60 inch circumference and a film thickness of 0.0015 inch. The extrudate was cut and heat sealed at 38 inch distances with a heated bar. A control run was made using the same polyethylene without the addition of the modified filler. The thus-produced bags were tested for Dart impact failure in with ASTM D-1709A. The results of these impact tests are summarized in Table I.

EXAMPLE II

Example I was repeated except separate samples of modified fillers were prepared by using the following inorganic fillers having hydrophilic surfaces in place of kaolin clay: titanium dioxide (rutile structure), barium sulfate, calcium sulfate and magnesium silicate (talc). Ground chips of each modified filler were blended with polyethylene as in Example I at a concentration of 5 wt. % and each of the resulting blends were formed into bags and tested for impact strength as described in Example I. The results of the impact tests are summarized in Table I.

EXAMPLE III

A modified filler was prepared in the same manner as in Example I except the concentration of the kaolin clay was 70 wt. %. Ground chips of the modified filler was blended with polyethylene resin in Example I at a concentration of 5 wt. % and the resulting blend was formed into bags and tested for impact strength as described in Example I. The results of the impact tests are summarized in Table I.

EXAMPLE IV

A test was performed to demonstrate that a filler containing lower amounts of the block copolymer are effective in improving impact strength. At lower block copolymer concentrations, it is difficult to compound inorganic fillers and the block copolymer with a Banbury mixer because of the poor flow characteristics of the mixture.

In this test 1 lb. of the block copolymer identified in Example 1 was dissolved in 2 gal. of methanol and 10 lb. of kaolin clay was added to the solution. The resulting slurry was stirred for 10 minutes, poured into a tray and the methanol was allowed to evaporate. The dried mixture was then heated in an oven for 10 minutes at 200° C, cooled and then ground into fine powder. Separate portions of this powder was blended with polyethylene as in Example I at respective concentrations of 3 and 6 wt. % and each of the resulting blends was formed into bags and tested for impact strength as described in Example I. Results of the impact tests are summarized in Table I.

EXAMPLE V

A modified kaolin clay filler prepared as described in Example I was blended at a concentration of 5 wt. % with a isotatic polypropylene having a melt flow rate of 12 (ASTM 1238) and the resulting blend was formed into bags and tested for impact strength as described in Example I. A control run was made using the same polypropylene without the addition of the modified filler. The results of the impact tests are summarized in Table I.

EXAMPLE VI

Example IV was repeated except that the powdered kaolin clay was blended directly with the polyethylene resin without prior coating with the block copolymer. Dispersion of the unmodified clay into the polyethylene resin was very poor, causing breaks in the film during processing. The results of the impact tests are summarized in Table I.

EXAMPLE VII

Using the block copolymer (without an inorganic filler) and the polyethylene resin identified in Example 1, separate blends were prepared containing 2.5 and 5 wt. % of the block copolymer, respectively. These blends were extruded through a repelletizing line to insure a homogeneous mixture of the polyethylene resin and the block copolymer. Each of the resulting blends were then formed into bags and tested for impact strength as described in Example I. The results of the impact tests are summarized in Table I.

ymer of ethylene oxide having an average molecular weight of 12,000 and (b) a homopolymer of propylene oxide having an average molecular weight of 14,000 were used in place of the block copolymer. The concentration of kaolin clay in each case was 50 wt. %. Each thus-modified kaolin clay filler was blended with polyethylene as an Example I at concentration of 5 and 10 wt. % and each of the resulting blends was then formed into bags and tested for impact strength as described in Example I. The dispersion of modified clay was good in all cases. The results of the impact strength tests are summarized in Table II.

EXAMPLE IX

A modified kaolin clay filler was prepared in the manner described in example I except a random polymer of ethylene oxide and propylene oxide having a mole ratio of ethylene oxide to propylene oxide of 80:20 and an average molecular weight of 12,000 was used in place of the block copolymer. The concentration of kaolin clay was 50 wt. %. The thus-modified kaolin clay filler was blended with the polyethylene resin as in Example I at a concentration of 10 wt. % and the resulting blend was then formed into bags and tested for impact strength as described in Example I. This blend

TABLE I

| Example | Run No. | Composition of Block Copolymer-modified Filler | | Composition of Filled Polyolefin Resin | | Impact Strength of Extruded Film, % Failure [1] | |
|---|---|---|---|---|---|---|---|
| | | Filler | Concentration of Filler, wt. % | Resin | Concentration of modified Filler, wt. % | Nip Roll | Seal |
| I | 1 | (control) | — | Polyethylene | 0 | 58 | 23 |
| | 2 | Kaolin clay | 50 | " | 5 | 17 | 0 |
| | 3 | " | 50 | " | 10 | 15 | 0 |
| II | 4 | $TiO_2$ | 50 | " | 5 | 0 | 0 |
| | 5 | $BaSO_4$ | 50 | " | 5 | 12 | 0 |
| | 6 | $CaSO_4$ | 50 | " | 5 | 17 | 6 |
| | 7 | $MgSiO_4$ | 50 | " | 5 | 0 | 3 |
| III | 8 | Kaolin clay | 70 | " | 5 | 6 | 3 |
| IV | 9 | " | 91 | " | 3 | 9 | 3 |
| | 10 | " | 91 | " | 6 | 11 | 0 |
| V | 11 | (control) | — | Polypropylene | 0 | 90 | 65 |
| | 12 | Kaolin clay | 50 | " | 5 | 24 | 6 |
| VI | 13 | " | 100 | Polyethylene | 3 | 100 | 45 |
| | 14 | " | 100 | " | 6 | 100 | 50 |
| VII | 15 | none | — | " | 2.5[2] | 52 | 25 |
| | 16 | none | — | " | 5[2] | 65 | 28 |

Notes:
[1] Average of at least 30 tests per ASTM D-1709 A using 60 g Dart weight
[2] Block copolymer without inorganic filler blended with the polyethylene resin From the tests results present in Table I, it can be seen that the impact strengths of films produced from thermoplastic polyolefinic resins were improved significantly by blending therewith various inorganic fillers modified in accordance with the invention, i.e., compare runs 2-10 with control run 1 for polyethylene and run 12 with the control run 11 for polypropylene. It can also be seen that films having unacceptable impact strengths were produced from a thermoplastic polyolefinic resin (polyethylene) containing an unmodified inorganic filler (runs 13 and 14). Further, it can be seen that film produced from a thermoplastic polyolefinic resin (polyethylene) containing only the block copolymer, without an inorganic filler, exhibited either substantially the same impact strengths as the control (compare run 15 with the control run 1) or impact strengths less than the control (compare run 16 with the control run 1).

EXAMPLE VIII

Modified kaolin clay fillers were prepared in the same manner as described in Example I except (a) a homopolwas difficult to extrude because of an aparent decrease in the melt viscosity at the film die of the extruder. The results of the impact strengths are summarized in Table II.

EXAMPLE X

A test was performed to determine the improvement in impact strength provided by a commercially available modified clay filler. In this test an organo-clay-polymer composition prepared in accordance with Example I of U.S. Pat. No. 3,697,474 and marketed under the trade name OX-1 by Freeport Kaolin Company, New York, N.Y. was used. This composition was blended with the polyethylene resin as in Example I at a concentration of 9 wt. % and the resultant blend was formed into bags and tested for impact strength as described in Example I. The dispersion of the clay and the film appeared to be excellent; however, a strong odor of oleic acid was noticable in the area surrounding the extruder and this odor remained with the film for several weeks. The results of the impact strength tests are summarized in Table II.

TABLE II

| Example | Run No. | Composition of Modified Filler | | Concentration of Modified Filler in Polyethylene wt. % | Impact Strength of Extruded Film, % Failure[1] | |
|---|---|---|---|---|---|---|
| | | Filler | Polymer Type | | Nip Roll | Seal |
| I | 1 | (control) | — | 0 | 58 | 23 |
| | 2 | Kaolin clay | Block copolymer[2] | 5 | 17 | 0 |
| | 3 | " | " | 10 | 15 | 0 |
| VIII | 17 | " | Polyethylene oxide[3] | 5 | 52 | 23 |
| | 18 | " | " | 10 | 46 | 22 |
| | 19 | " | Polypropylene oxide[4] | 5 | 45 | 33 |
| | 20 | " | " | 10 | 42 | 35 |
| IX | 21 | " | Random copolymer[5] | 10 | 65 | 28 |
| X | 22 | OX-1[6] | — | 9 | 45 | 18 |

Notes:
[1]See note [1] Table I
[2]Block copolymer of ethylene oxide and propylene oxide identified in Example I
[3]Ethylene oxide homopolymer identified in Example VIII
[4]Propylene oxide homopolymer identified in Example VIII
[5]Random copolymer of ethylene oxide and propylene oxide identified in Example IX
[6]Organo-clay-polymer composition identified in Example X From the tests results presented in Table II, it can be seen that an inorganic filler (kaolin clay) modified with either a homopolymer of ethylene oxide or a homopolymer of propylene oxide provided only a marginal improvement in the impact strength of the polyethylene film as compared to that provided by a filler of the invention (compare runs 17–20 with runs 2 and 3 and the control run 1). Also, it can be seen that an inorganic filler (kaolin clay) modified with a random copolymer of ethylene oxide and propylene oxide caused a reduction in the impact strengths of the polyethylene film rather than the marked improvement provided by a filler of the invention (compare run 21 with run 3 and the control run 1) even though the mole ratio of ethylene oxide to propylene oxide of the random copolymer was the same as that for the block copolymer. Further, it can be seen that the commercially available filler OX-1 provided a marginal improvement in the impact strength of the polyethylene film in comparison to that provided by a filler of the invention (compare run 22 with run 3 and the control run 1). Furthermore, as mentioned above, the film produced from polyethylene containing the commercially available filler composition had an undesirable odor.

EXAMPLE XI

Tests were performed to determine the effect of the temperature used during compounding of the block copolymer with the inorganic filler. In these tests, the compounding procedure described in Example I was followed except a temperature of (a) 110° C and (b) 70° C was used. The concentrations of the kaolin clay in both cases was 50 wt. %. Ground chips of the thus-compounded kaolin clay were blended with the polyethylene resin as in Example I at a concentration of 5 wt. % and each of the resulting blends was then formed into bags and tested for impact strengths as described in Example I. The impact failure percentages during the nip roll and seal tests were respectively 21 and 0 for the modified kaolin clay compounded at 110° C and 52 and 15 for the modified kaolin clay compounded at 70° C.

From these results, it can be seen that the kaolin clay compounded at a temperature below 80° C, i.e., 70° C, did not impart any improvement in the impact strength of the polyethylene resin.

EXAMPLE XII

A series of tests were performed to determine the effect of the molecular weight and the mole ratio of ethylene oxide to propylene oxide in the block copolymer used for modifying inorganic fillers in accordance with the invention. In these tests, separate samples of block copolymers having varying average molecular weight and varying ethylene/propylene oxide mole ratios were compounded with kaolin clay as in Example I with the concentrations of the clay being 50 wt. % in each case. Samples of each thus-modified kaolin clay were blended with polyethylene as in Example I at a concentration of 5 wt. % and then formed into bags and tested for impact strength as described in Example I. The results of the impact tests are summarized in Table III.

TABLE III

| Composition of Block Copolymer, Ethylene oxide/Propylene oxide mole ratio | Average Molecular Wt. Block Copolymer | Impact Strength of Extruded Film, % Failure | |
|---|---|---|---|
| | | Nip Roll | Seal |
| 80:20[2] | 14,000[2] | 17[2] | 0[2] |
| 80:20 | 6,000 | 15 | 0 |
| 80:20 | 2,000 | 40 | 20 |
| 60:40 | 10,000 | 10 | 0 |
| 60:40 | 5,000 | 17 | 0 |
| 60:40 | 2,000 | 50 | 25 |
| 40:60 | 10,000 | 33 | 12 |
| 40:60 | 5,000 | 30 | 9 |
| 40:60 | 2,000 | 60 | 45 |

From the results presented in Table III, it can be seen that an inorganic filler (kaolin clay) modified with a block copolymer of ethylene oxide and propylene oxide having an average molecular weight below 3,000, i.e., 2,000, did not provide a significant improvement in the impact strength of the polyethylene resin.

From the foregoing description, one skilled in the art can easily ascertain the essential characteristics of the invention and, without departing from the spirit and scope thereof, can make various changes and modifications of the invention to adapt it to various uses and conditions.

What is claimed is:

1. A particulate filler material which is readily dispersible in thermoplastic polymeric resins, said filler material comprising a particulate inorganic filler which has a hydrophilic surface having an aqueous wetting angle of less than 50° and coated with a block copolymer having an A-B-A structure with the A units being a homopolymer of ethylene oxide, the B unit being a homopolymer of propylene oxide, and the mole ratio of ethylene oxide to propylene oxide being within the range of 40:60 and 90:10 and having an average molecular weight of at least 3,000, the amount of said inorganic filler being within the range of about 5 to about 95 weight %, based on the total weight of said filler material.

2. A filler material according to claim 1 wherein said inorganic filler is selected from the group consisting of kaolin clay, titanium dioxide, barium sulfate, calcium sulfate, calcium carbonate, magnesium silicate, zinc oxide, diatomaceous earth, and mixtures thereof.

3. A filler material according to claim 2 wherein the amount of said inorganic filler is within the range of about 10 to about 50 weight %, based on the total weight of said filler material.

* * * * *

UNITED STATES PATENT AND TRADEMARK OFFICE
CERTIFICATE OF CORRECTION

PATENT NO. : 4,091,164

DATED : May 23, 1978

INVENTOR(S) : Eckhard C. A. Schwarz

It is certified that error appears in the above—identified patent and that said Letters Patent is hereby corrected as shown below:

On the title page, insert Assignee to read as follows:

(73) Assignee: Presto Products Incorporated
Appleton, Wisconsin 54911

Signed and Sealed this

Twenty-first Day of October, 1986

[SEAL]

Attest:

DONALD J. QUIGG

*Attesting Officer*   *Commissioner of Patents and Trademarks*